Figure 1:
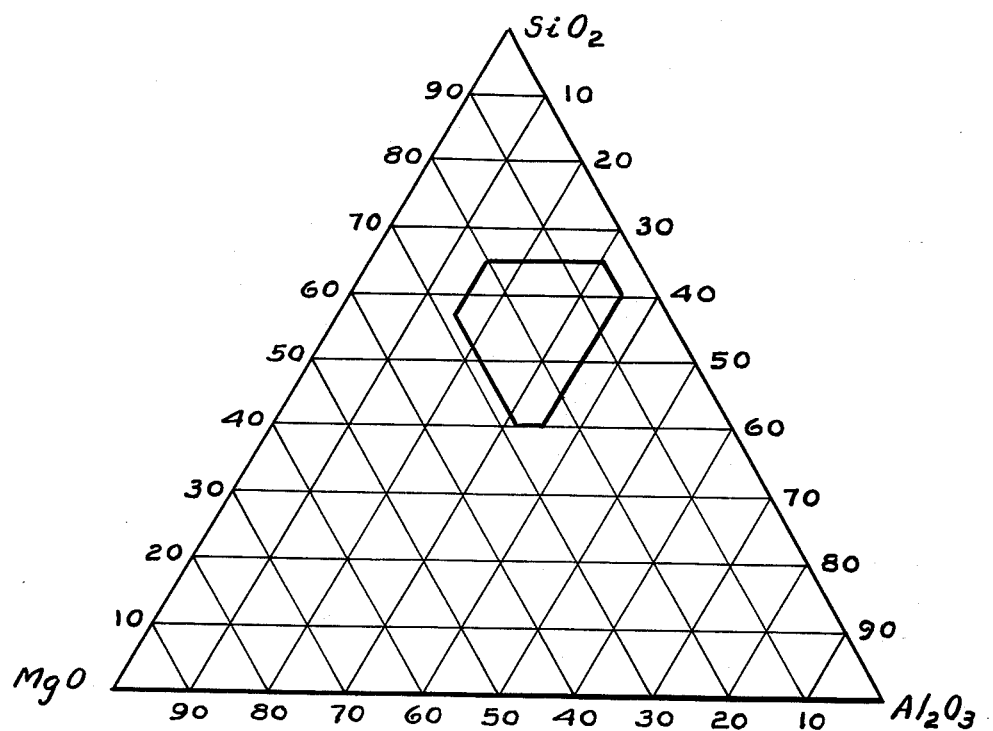
Figure 2:
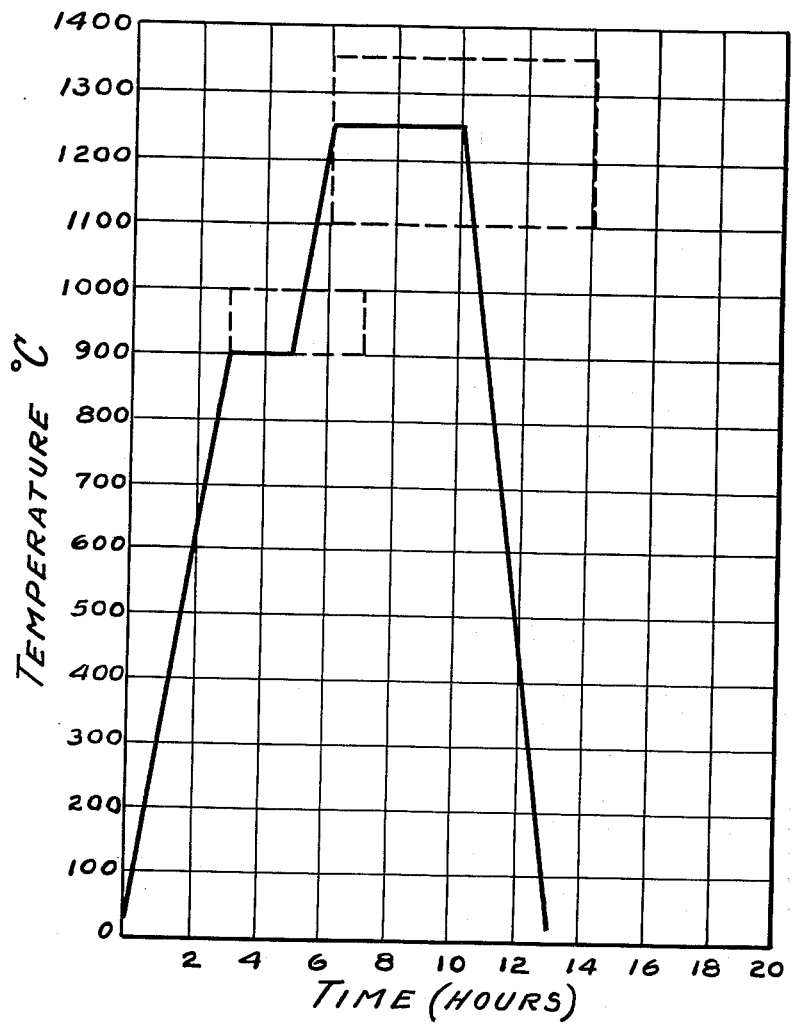

Sept. 7, 1965  S. D. STOOKEY  3,205,079
SEMICRYSTALLINE CERAMIC BODY AND METHOD OF MAKING IT
Filed March 29, 1962  2 Sheets-Sheet 1

INVENTOR.
STANLEY D. STOOKEY
BY
ATTORNEY

INVENTOR.
STANLEY D. STOOKEY 3,205,079
SEMICRYSTALLINE CERAMIC BODY AND
METHOD OF MAKING IT
Stanley D. Stookey, Corning, N.Y., assignor to Corning
Glass Works, Corning, N.Y., a corporation of New York
Filed Mar. 29, 1962, Ser. No. 183,584
5 Claims. (Cl. 106—39)

This invention relates to the manufacture of semicrystalline ceramic bodies consisting primarily of compositions within the ternary system $MgO \cdot Al_2O_3 \cdot SiO_2$.

The production of semicrystalline ceramic bodies or glass-ceramics, as they are sometimes called, is a relatively recent development in the glass industry. This process normally involves heat treating glass shapes under such conditions that a controlled crystallization is induced. Generally, the process comprises melting a glass-forming batch into which has been introduced a nucleating or crystallization-promoting agent, simultaneously shaping and cooling the melt into a glass body, and thereafter heat treating the body following a specific heating schedule. In this way, the glass shape is converted into a body composed of fine-grained, randomly-oriented crystals dispersed substantially uniformly in a glassy matrix and comprising a major proportion of the mass of the body.

This crystallization in situ from a glass body provides several advantages which cannot be enjoyed in other modes of manufacturing crystalline bodies. First, the material can be formed into any shape that a glass can be, i.e., by blowing, rolling, pressing, spinning, drawing, or casting. Second, as the crystallization is carefully controlled within the glass shape, a substantially homogeneous body results which is substantially void-free and non-porous. Third, the crystallization is carefully controlled so crystals of substantially uniform fineness are produced thus obviating the inherent unfavorable qualities present in a body containing both coarse and fine-grained material.

A particularly useful nucleating or crystallization-promoting agent is titania ($TiO_2$). The efficiency of this agent is described in my United States Patent No. 2,920,971. However, $TiO_2$ is a flux and, therefore, $TiO_2$-nucleated glass-ceramics are not applicable where sustained high temperatures are encountered.

Further, $TiO_2$-nucleated bodies are susceptible to failure when subjected to reducing atmospheres. The last characteristic renders such bodies of limited utility in the field of electrical insulation products where a ceramic body is sealed to a metal element. Very often a reducing atmosphere must be induced to protect the metal.

The principal object of this invention is to provide a method of making a glass-ceramic body consisting primarily of $MgO, Al_2O_3$, and $SiO_2$ which is dense, strong, has excellent resistance to thermal shock, is capable of being used at high temperatures, and retains those desirable properties when subjected to reducing conditions.

Another object of this invention is to provide a method of making such a glass-ceramic body which is relatively simple in operation, economical in practice, and which uses apparatus and techniques presently known to the art.

I have discovered, and it is upon this discovery my invention is based, that zirconia ($ZrO_2$) effectively nucleates certain glass-forming $MgO \cdot Al_2O_3 \cdot SiO_2$ compositions, the semicrystalline bodies produced thereby being capable of withstanding temperatures over about 1200° C., being relatively unaffected when subjected to reducing conditions, and very resistant to thermal shock. These articles are useful in the construction of furnace walls, in electrical components wherein a metallic element must be sealed which sealing must be undertaken in a reducing atmosphere, and in dinnerware, to mention but a few applications.

In the broadest terms, the preferred embodiment of my invention comprises heat treating a glass body consisting essentially of about 40–65% by weight of $SiO_2$, about 13–35% by weight of $Al_2O_3$ about 5–28% by weight of $MgO$ and about 5–25% by weight of $ZrO_2$. A glass-forming batch containing the above constituents is melted, cooled and simultaneously formed into the desired shape, said shape thereafter being exposed to a temperature of 900°–1000° C. for about ½–4 hours to initiate crystallization and then raised to a temperature of about 1100°–1350° C. for a time sufficient to attain the desired crystallization, generally from about 1–8 hours.

In the following examples, the batches were ball milled prior to melting in order to obtain better glass homogeneity and more efficient melting and the ingredients then fused together at 1550°–1800° C. in crucibles, pots, or tanks, depending upon the quantity of product desired. The melts were poured in molds, cooled in air until fairly rigid, and then transferred to an annealer operating at 800°–900° C. wherein the shapes were cooled as a glass to room temperature. The glass shapes were thereafter placed in a furnace and heated at about 5° C./minute to the temperature range for initiating crystallization, as recorded in Table II set out hereinafter, and maintained thereat for the proper time. The furnace temperature was then raised at about 5° C./minute to the second level of heat treatment and held thereat to attain the desired crystallization. Finally, the shapes were allowed to cool to room temperature at a rate commensurate with their resistance to thermal shock.

It will be understood that the heat-up schedule employed is selected to protect the glass shape from thermal shock and deformation. The 5° C./minute rate has been found to be satisfactory in most cases in preventing breakage due to thermal shock and excessive deformation of the glass shape as it is being heated beyond its softening point and before crystallization has progressed sufficiently to support the shape. The crystallization of the glass during the heat treatment proceeds more rapidly as the temperature approaches the liquidus of the crystal phase. Nevertheless, at the commencement of crystallization, the proportion of crystals to glassy matrix is very small and the article will not retain its shape if the temperature is raised too rapidly. Thus, the rate of temperature increase must be in substantial accord with the rate of crystallization; otherwise, deformation, due to a lowering of viscosity, will render the final product generally of little use. Hence, I prefer to raise the temperature at about 5° C./minute in order to obtain dense crystallization with little, if any, deformation as the body is heated above the softening point of the glass. However, more rapid heating rates have given useable bodies, particularly where some physical support has been provided. It will be obvious that a very slow increase in temperature will also yield a product having satisfactory crystallinity.

Where more efficient and economical use of heat is desired, the particular heat treatments may be carried out immediately following the shaping of the plastic glass while it is still hot, rather than cooling to room temperature and subsequently reheating. Thus, the shape may be merely cooled to just below the transformation point, i.e., the temperature at which the liquid glass is considered to become a solid, this temperature being in the vicinity of the annealing point of the glass, and the specified reheating schedule thereafter followed.

Finally, although a two-step heat treating process is preferred, I have learned that an adequately crystalline body can be obtained where a glass shape is raised to a temperature over the transformation point, say about 900° C., and maintained thereat until the desired crystallization is attained. Where a low temperature is used (the 900° C. above), a very long period of time, 24 hours and, perhaps, even longer, will be required. If a higher constant temperature is employed, the crystallization rate will be more rapid. However, here again, the rate of crystallization preferably should substantially balance the decrease in viscosity of the body.

My preferred method comprises a two-step heat treatment as I have found total deformation to be less where a short hold at a lower temperature is used to initiate crystallization.

In its simplest terms my invention contemplates three steps: (1) melting the glass-forming batch; (2) cooling the melt below the transformation point to a glass shape; and (3) heat treating the glass shape above about 900° C., but not more than about 1350° C., for a time sufficient to attain the desired crystallization.

Table I sets out examples produced in accordance with the preferred embodiment of my invention having compositions of glasses encompassed in the aforementioned ranges, calculated from their respective batches on the oxide basis in weight percent, exclusive of impurities which may be present in the batch materials, and the melting temperatures therefor. The batches may be composed of any materials, either oxides or other compounds, which, on being melted together, are converted to the desired oxide compositions in the desired proportions.

Table II records the heat treating schedules, descriptions of the bodies, crystal phases present, as determined by X-ray diffraction analyses, and some modulus of rupture (p.s.i.), coefficient of thermal expansion ($\times 10^{-7}$), and density (g./cc.) measurements. Although the crystal structure and physical properties were not obtained in every composition studied, each of the following examples represents a batch which yielded a satisfactory product.

The above cited ranges of $SiO_2$, $Al_2O_3$, MgO, and $ZrO_2$ have been found to be critical to the invention. I have found that where more than about 65% by weight of $SiO_2$ is present, a glass is produced which is too viscous to melt properly. Where more than about 35% by weight of $Al_2O_3$ is present, a very viscous melt results and there is a great tendency for the melt to crystallize during the cooling and forming step. However, sufficient $Al_2O_3$ must be present to lend strength and durability to the body. An excess of MgO tends to cause the formation of incompatible crystal phases which decrease the resistance of the body to thermal shock and may even cause breakage of the article during the heat treatment. At least about 5% by weight of MgO must be present to aid in melting the batch and stabilizing the glass against crystallization as the melt is cooled and shaped. Sufficient $ZrO_2$ must be added to insure adequate nucleation but more than about 25% by weight cannot be readily dissolved in the melt and such amount also tends to induce crystallization of the melt during the initial cooling.

Other compatible metal oxides may be present provided their total amount does not exceed about 10% by weight of the batch. Such oxides include $TiO_2$, $B_2O_3$, PbO, MnO, and $Cr_2O_3$. $TiO_2$ and $B_2O_3$ are fluxes which aid in melting the batch and also promote crystallization during the heat treating process. These two components are preferably present in but small amounts as they have an adverse effect on the mechanical strength of the product, and glasses containing substantial amounts of $TiO_2$ are subject to disintegration when exposed to reducing conditions. PbO also promotes crystallization and, along with MnO, improves the thermal shock resistance of the body. $Cr_2O_3$ is of assistance in improving the strength of the body and its resistance to the effects of a reducing atmosphere.

Although the melts hereinafter described are of low viscosity, a fining agent such as $As_2O_3$ may be added to the batch. Normally, about 0.5–1.0% by weight is added and, as the quantity remaining in the glass after the batch has been melted is too small to have any material effect on the fundamental properties of the glass, this constituent was not included in the folowing table.

Table I

|  | 1 | 2 | 3 | 4 | 5 | 6 | 7 |
|---|---|---|---|---|---|---|---|
| $SiO_2$ | 49.3 | 48.4 | 48.0 | 46.7 | 50.0 | 44.7 | 46.1 |
| $Al_2O_3$ | 17.5 | 17.1 | 17.0 | 16.5 | 30.0 | 15.8 | 31.3 |
| MgO | 26.5 | 26.1 | 25.8 | 25.1 | 6.0 | 24.0 | 6.2 |
| $ZrO_2$ | 6.5 | 8.3 | 10.0 | 11.5 | 14.0 | 15.5 | 16.5 |
| Melting temp., °C | 1,550 | 1,550 | 1,550 | 1,550 | 1,800 | 1,550 | 1,800 |

|  | 8 | 9 | 10 | 11 | 12 | 13 | 14 |
|---|---|---|---|---|---|---|---|
| $SiO_2$ | 55.0 | 48.0 | 40.0 | 43.0 | 60.0 | 46.0 | 47.8 |
| $Al_2O_3$ | 20.0 | 17.0 | 30.0 | 28.0 | 16.0 | 16.0 | 17.8 |
| MgO | 5.0 | 25.8 | 5.0 | 7.0 | 8.0 | 24.0 | 23.5 |
| $ZrO_2$ | 20.0 | 5.0 | 20.0 | 17.0 | 8.0 | 7.0 | 9.7 |
| $TiO_2$ |  | 5.0 |  |  | 5.0 | 3.0 |  |
| PbO |  |  | 5.0 |  |  |  |  |
| MnO |  |  |  | 5.0 |  |  |  |
| $B_2O_3$ |  |  |  |  | 3.0 | 1.0 |  |
| $Cr_2O_3$ |  |  |  |  |  | 3.0 | 2.0 |
| Melting temp. °C | 1,800 | 1,800 | 1,800 | 1,800 | 1,800 | 1,600 | 1,550 |

Table II

| Sample No. | Reheat schedule | Crystal phases | Expansion coeff. (25°–300° C.) | Density | Modulus of rupture |
|---|---|---|---|---|---|
| 1 | 900° C—2 hrs / 1250° C—2 hrs | MgO–$SiO_2$ / Cristobalite | 34.9 | 2.7787 | 12,450 |
| 2 | 900° C—2 hrs / 1250° C—2 hrs | MgO–$SiO_2$ / $ZrO_2$ |  | 2.7918 | 13,200 |
| 3 | 900° C—2 hrs / 1250° C—2 hrs | MgO–$SiO_2$ / $ZrO_2$ | 50.5 | 2.8276 | 16,300 |
| 4 | 950° C—3 hrs / 1150° C—4 hrs | MgO–$SiO_2$ / $ZrO_2$ | 52.1 | 2.8465 |  |
| 5 | 950° C—1 hr / 1100° C—6 hrs | $ZrO_2$ / Mullite / Cristobalite | 100.2 | 3.128 | 19,400 |
| 6 | 900° C—2 hrs / 1250° C—2 hrs | MgO–$SiO_2$ / $ZrO_2$ | 60.3 |  | 17,200 |
| 7 | 980° C—1 hr / 1180° C—8 hrs | Mullite / Cristobalite / Cordierite / $ZrO_2$ | 87.6 | 3.209 |  |
| 8 | 950° C—1 hr / 1100° C—6 hrs | $ZrO_2$ / Cristobalite |  |  | 13,700 |
| 9 | 950° C—1 hr / 1100° C—6 hrs | MgO–$SiO_2$ / $ZrO_2$ | 39.8 | 2.6573 | 10,400 |
| 10 | 900° C—4 hrs / 1300° C—8 hrs | Mullite / Cordierite / $ZrO_2$ |  |  | 15,600 |
| 11 | 1000° C—1 hr / 1350° C—1 hr | Mullite / $ZrO_2$ | 77.6 |  |  |
| 12 | 950° C—1 hr / 1150° C—4 hrs | MgO–$SiO_2$ / Cristobalite / $ZrO_2$ | 42.1 |  | 12,600 |
| 13 | 900° C—2 hrs / 1300° C—5 hrs | MgO–$SiO_2$ / Cristobalite | 48.4 | 2.8649 | 16,500 |
| 14 | 950° C—½ hr / 1250° C—6 hrs | MgO–$SiO_2$ / Cristobalite / $ZrO_2$ | 58.7 |  | 15,900 |

Table II establishes the effectiveness of zirconia as a nucleator, or crystallization-promoter, in glasses composed of magnesia, alumina, and silica. Laboratory tests have demonstrated the crystal content can very depending upon the extent to which the components of the batch are adaptable to the formation of crystal phases. However, it is believed that the crystal content of the body is at least 30% by weight and generally in excess of 50%. The higher crystal contents are preferred. The crystals, themselves, are small, substantially all finer than 30 microns in diameter, and are randomly oriented in the glassy matrix.

Table II also illustrates that the invention provides semicrystalline bodies which are dense, strong, and resistant to thermal shock. Field trials and laboratory experience have demonstrated that these bodies are capable of being heated in reducing atmospheres without an adverse effect being observed in their physical properties. A still further advantage which these bodies possess over the $TiO_2$-nucleated in their application of providing seals to metal elements involves their coefficients of thermal expansion. The coefficients are somewhat higher, thus indicating their resistance to thermal shock is not quite as good as the $TiO_2$-nucleated, but they closely match those of tungsten and molybdenum, two metals frequently used in electrical components.

Although each of the above examples was shaped by pouring into steel molds, it will be appreciated that any of the conventional glass forming methods such as pressing, rolling, blowing, or spinning is likewise applicable to the invention.

FIGURE I sets out the ranges of the compositions of MgO, $Al_2O_3$ and $SiO_2$ included in my invention.

FIGURE II depicts a time-temperature curve for the heat treatment of a specific example of my invention, viz. Example 6 which has a coefficient of thermal expansion very closely matching that of molybdenum, wherein after the batch had been melted, shaped, and cooled to room temperature, the glass body was subjected to the following heat treatment: the temperature was raised at 5° C./minute to 900° C., held thereat for 2 hours, thereafter the temperature was raised at 5° C./minute to 1250° C., held thereat for 4 hours, and then cooled at 5° C./minute to room temperature. The area enclosed within the dotted lines represents the ranges of my preferred two-step process. This final cooling rate, as noted above, is extremely flexible in that it varies with the resistance to thermal shock of the bodies. As the coefficients of thermal expansion of the products of this invention are relatively low, the cooling can be quite rapid. Frequently, the heat to a furnace is merely cut off and the furnace allowed to cool at its own rate. However, I have learned that a cooling rate of 5° C./minute, while perhaps overly conservative, insures against loss by thermal breakage in every instance.

What is claimed is:

1. A method of manufacturing a semicrystalline ceramic body capable of withstanding temperatures over about 1200° C. and being relatively unaffected by reducing atmospheres. comprising the steps of melting a glass-forming composition consisting, by weight, of about 40–65% of $SiO_2$, about 15–35% of $Al_2O_3$, about 5–28% of MgO, and about 5–25% of $ZrO_2$ as a nucleating agent, the total of said $SiO_2$, $Al_2O_3$, MgO, and $ZrO_2$ comprising at least about 90% of said composition and up to 10% total of the compatible metal oxides $B_2O_3$, PbO, MnO, and $Cr_2O_3$, simultaneously cooling the melt below the transformation point of said melt and shaping a body therefrom thereafter exposing said body to a temperature of at least about 900° C., but not over about 1350° C., for a time sufficient to attain the desired crystallization, and then cooling said shape to room temperature.

2. A method of manufacturing a semicrystalline ceramic body capable of withstanding temperatures over about 1200° C. and being relatively unaffected by reducing atmospheres comprising the steps of melting a glass-forming composition consisting, by weight, of about 40–65% of $SiO_2$, about 15–35% of $Al_2O_3$, about 5–28% of MgO, and about 5–25% of $ZrO_2$ as a nucleating agent, the total of said $SiO_2$, $Al_2O_3$, MgO and $ZrO_2$ comprising at least about 90% of said composition and up to 10% total of the compatible metal oxides $B_2O_3$, PbO, MnO, and $Cr_2O_3$, simultaneously cooling the melt below the transformation point of said melt and shaping a body therefrom, thereafter exposing said body to a temperature range of about 900°–1000° C. for about 0.5–4 hours, raising the temperature to about 1100°–1350° C. maintaining thereat for about 1–8 hours, and then cooling to room temperature.

3. A semicrystalline ceramic body capable of withstanding temperatures over about 1200° C. and being relatively unaffected by reducing atmospheres consisting essentially of a multiplicity of fine-grained, randomly-oriented, inorganic crystals dispersed in a glassy matrix, said crystals being formed by crystallization in situ from a glass body consisting, by weight, of about 40–65% of $SiO_2$, about 15–35% of $Al_2O_3$, about 5–28% of MgO, and about 5–25% of $ZrO_2$ as a nucleating agent, the total of said $SiO_2$, $Al_2O_3$, MgO, and $ZrO_2$ comprising at least about 90% of said glass body and up to 10% total of the compatible metal oxides $B_2O_3$, PbO, MnO, and $Cr_2O_3$, said glassy matrix consisting essentially of the uncrystallized portion of the glass remaining after crystallization of said crystals.

4. A semicrystalline ceramic body according to claim 3 wherein substantially all of said crystals are finer than 30 microns in diameter.

5. A semicrystalline ceramic body according to claim 3 wherein said crystals comprise at least 30% by weight of said body.

References Cited by the Examiner

UNITED STATES PATENTS

| | | | |
|---|---|---|---|
| 2,920,971 | 1/60 | Stookey | 106—39 |
| 3,022,180 | 2/62 | Morrissey et al. | 106—39 |
| 3,117,881 | 1/64 | Henry | 106—39 |

FOREIGN PATENTS 429,367    5/35    Great Britain.

OTHER REFERENCES

Meyer, German application, 1,099,135, printed Feb. 9, 1961.

Harmon, Ceramic Industry, "New Concept Is Basis for Developing New, Better Ceramics," pages 52–53, Aug. 1959.

TOBIAS E. LEVOW, *Primary Examiner.*